US012369537B2

(12) United States Patent
Kim et al.

(10) Patent No.: US 12,369,537 B2
(45) Date of Patent: Jul. 29, 2025

(54) LOW IMPACT DEVELOPMENT PLANT BOX

(71) Applicant: KCTL Laboratory Co., Ltd, Anyang-si (KR)

(72) Inventors: Young Man Kim, Anyang-si (KR); Eui Ju Kim, Cheongju-si (KR); Joon Ho Park, Gunpo-si (KR)

(73) Assignee: KCTL Laboratory Co., Ltd, Anyang-si (KR)

( * ) Notice: Subject to any disclaimer, the term of this patent is extended or adjusted under 35 U.S.C. 154(b) by 0 days.

(21) Appl. No.: 18/470,718

(22) Filed: Sep. 20, 2023

(65) Prior Publication Data

US 2024/0130304 A1 Apr. 25, 2024
US 2024/0224892 A9 Jul. 11, 2024

(30) Foreign Application Priority Data

Oct. 24, 2022 (KR) .......................... 10-2022-0137201

(51) Int. Cl.
*A01G 9/28* (2018.01)
*A01G 9/02* (2018.01)

(52) U.S. Cl.
CPC ............... *A01G 9/28* (2018.02); *A01G 9/028* (2013.01)

(58) Field of Classification Search
CPC .......... A01G 9/28; A01G 9/027; A01G 9/028; A01G 9/025; A01G 9/033; E04B 2/18
See application file for complete search history.

(56) References Cited

U.S. PATENT DOCUMENTS

| 460,177 | A | * | 9/1891 | Cook | E04F 15/02 52/286 |
| 986,395 | A | * | 3/1911 | King | A01G 9/28 47/33 |
| 2,619,829 | A | * | 12/1952 | Tatum | E04B 2/14 52/286 |
| 3,389,499 | A | * | 6/1968 | Haile | E04C 1/395 47/33 |
| 3,906,665 | A | * | 9/1975 | Medlin | A01G 9/027 52/590.1 |
| 7,784,217 | B2 | * | 8/2010 | San Solo | A01G 25/06 47/33 |
| 2004/0088929 | A1 | | 5/2004 | Dawson et al. | |
| 2005/0016063 | A1 | * | 1/2005 | Shen | A01G 9/28 47/33 |
| 2018/0139910 | A1 | * | 5/2018 | Mobed | A01G 17/00 |
| 2021/0112731 | A1 | * | 4/2021 | Fischer | A01G 9/28 |

FOREIGN PATENT DOCUMENTS

| BE | 808828 A * | 4/1974 | ............. A01G 9/027 |
| GB | 2249932 A * | 5/1992 | ............. A01G 1/00 |
| JP | 2001320974 A | 11/2001 | |
| KR | 20-1999-0008525 U | 3/1999 | |
| KR | 10-1345009 B1 | 12/2013 | |
| KR | 10-2019-0057525 A | 5/2019 | |
| WO | WO-2013044220 A2 * | 3/2013 | ............. A01G 1/08 |

\* cited by examiner

*Primary Examiner* — Kristen C Hayes
(74) *Attorney, Agent, or Firm* — Bridgeway IP Law Group, PLLC; Jihun Kim

(57) ABSTRACT

A low impact development plant box built on a road and/or residential area, comprising a plurality of segment boxes each having any one of curved, straight line, and slanted shapes in such a way as to provide a structure with a given shape when coupled to one another and an accommodation space formed therein to accommodate planting soil in which a plant is planted.

5 Claims, 13 Drawing Sheets

LOW IMPACT DEVELOPMENT PLANT BOX

CROSS REFERENCE TO RELATED APPLICATION OF THE DISCLOSURE

The present application claims the benefit of Korean Patent Application No. 10-2022-0137201 filed in the Korean Intellectual Property Office on Oct. 24, 2022, the entire contents of which are incorporated herein by reference.

BACKGROUND OF THE DISCLOSURE

Field of the Disclosure

The present disclosure relates to a low impact development (hereinafter, referred to as LID) plant box, more particularly to an LID plant box that is capable of allowing rainwater runoff to be returned to a natural water circulation system through infiltration, storage, and evapotranspiration and being easy in manufacturing and construction to achieve the reduction of a construction cost.

Background of the Related Art

An LID technique is introduced and adopted on a site to allow rainwater runoff flowing over the ground surfaces of streets and sidewalks/roads to be returned to a natural water circulation system through infiltration, storage, and evapotranspiration. The LID technique is applied to a development project for sustainable development through which the influences caused by the development are minimized.

The LID plant box utilizes a downtown green space or a flower bed into which existing trees are planted to store or stay rainwater therein and has ground cover plants, shrubs, and the like planted therein, thereby ensuring a green zone forming function and a rainwater management function. Further, the LID plant box is built by combining a planting function the existing flower bed has and rainwater staying, filtration, and infiltrating functions. Furthermore, the LID plant box is applicable to various downtown spaces, such as sidewalks, parking lots, flower beds adjacent to buildings, and the like.

PRIOR ART LITERATURE

Patent Literature

Korean Patent No. 10-1345009

SUMMARY OF THE DISCLOSURE

Accordingly, the present disclosure has been made in view of the above-mentioned problems occurring in the related art, and it is an object of the present disclosure to provide an LID plant box that is capable of allowing rainwater runoff to be returned to a natural water circulation system through infiltration, storage, and evapotranspiration.

It is another object of the present disclosure to provide an LID plant box that is capable of being easy in manufacturing and construction to achieve the reduction of a construction cost.

The technical problems to be achieved through the present disclosure are not limited as mentioned above, and other technical problems not mentioned herein will be obviously understood by one of ordinary skill in the art through the following description.

To accomplish the above-mentioned objects, according to the present disclosure, there is provided an LID plant box built on a road and/or residential area, the plant box including a plurality of segment boxes each having any one of curved, straight line, and slanted shapes in such a way as to provide a structure with a given shape when coupled to one another and an accommodation space formed therein to accommodate planting soil in which a plant is planted.

According to the present disclosure, desirably, each segment box may include: a plurality of side walls extending in a longitudinal direction thereof; a base connecting the undersides of the plurality of side walls to each other; a first connection rod connecting first positions of one side end of the plurality of side walls to each other; and a second connection rod connecting second positions of the other side end of the plurality of side walls to each other.

According to the present disclosure, desirably, the first connection rod may connect the first positions of one side end of the plurality of side walls to each other, while forming given open areas on upper and lower portions of one side end of the plurality of side walls.

According to the present disclosure, desirably, the second connection rod may connect the second positions of the other side end of the plurality of side walls to each other, while being located above the first connection rod.

According to the present disclosure, desirably, the first connection rod or the second connection rod may have a fastening hole adapted to insert and/or pass a fastening member thereinto and/or therethrough, and the fastening hole may be formed to pass through the first connection rod or the second connection rod in a vertical direction to the base.

According to the present disclosure, desirably, the plurality of curved segment boxes may be coupled to one another to provide the circular structure, while being arranged at given angles and/or with given numbers.

According to the present disclosure, desirably, the plurality of segment boxes may have left curved segment boxes and right curved segment boxes, and the left curved segment boxes and the right curved segment boxes may be coupled to one another to provide the peanut-shaped structure.

BRIEF DESCRIPTION OF THE DRAWINGS

The above and other objects, features and advantages of the present disclosure will be apparent from the following detailed description of the embodiments of the disclosure in conjunction with the accompanying drawings, in which.

DETAILED DESCRIPTION OF THE EMBODIMENTS

Figure 1:
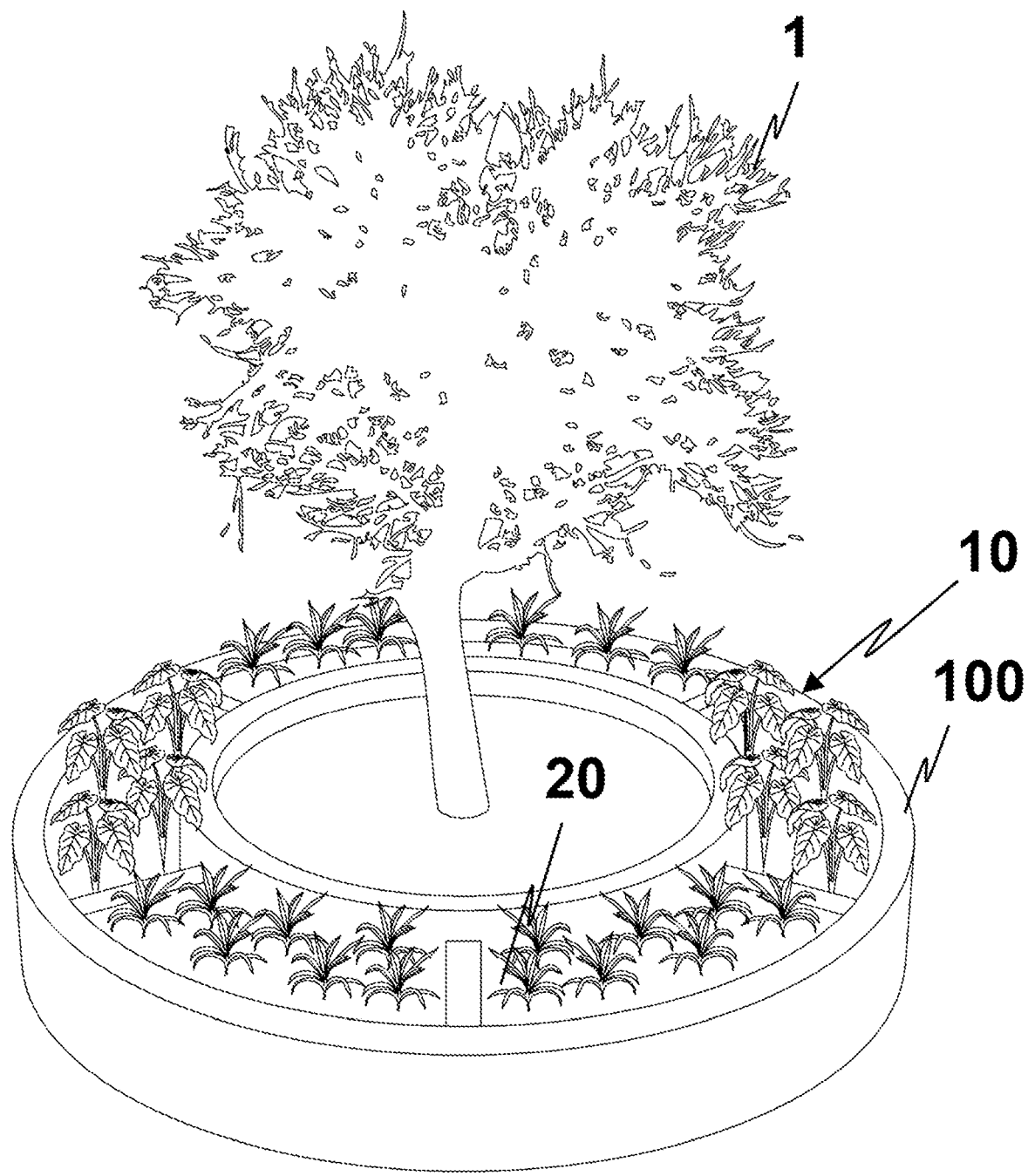
FIG. 1 is a schematic view showing an LID plant box according to the present disclosure.

Hereinafter, an explanation of the present disclosure will be given in detail with reference to the attached drawings. Before the present disclosure is disclosed and described, it is to be understood that the disclosed embodiments are merely exemplary of the disclosure, which can be embodied in various forms. In order to facilitate the general understanding of the present disclosure in describing the present disclosure, through the accompanying drawings, the same reference numerals will be used to describe the same components and an overlapped description of the same components will be omitted.

When it is said that one element is described as being "connected" or "coupled" to the other element, one element may be directly connected or coupled to the other element, but it should be understood that another element may be present between the two elements. In the description, when it is said that one portion is described as "includes" any component, one element further may include other components unless no specific description is suggested.

Terms used in this application are used to only describe specific exemplary embodiments and are not intended to restrict the present disclosure. An expression referencing a singular value additionally refers to a corresponding expression of the plural number, unless explicitly limited otherwise by the context. In this application, terms, such as "comprise", "include", or 'have", are intended to designate those characteristics, numbers, steps, operations, elements, or parts which are described in the specification, or any combination of them that exist, and it should be understood that they do not preclude the possibility of the existence or possible addition of one or more additional characteristics, numbers, steps, operations, elements, or parts, or combinations thereof.

To achieve the efficiency of the LID technique, according to the present disclosure, a downtown green space or a flower bed into which existing trees are planted is utilized to store or stay rainwater therein, and ground cover plants, shrubs, and the like are planted to ensure a green zone forming function and a rainwater management function.

According to the present disclosure, further, a planting function the existing flower bed has is combined with rainwater staying, filtering, and infiltrating functions. Furthermore, an LID plant box of the present disclosure is applicable to various downtown spaces, such as sidewalks, parking lots, flower beds adjacent to buildings, and the like.

Now, an explanation of an embodiment of the present disclosure will be given in detail with reference to the attached drawings.

Referring to FIGS. 1 to 13, an LID plant box 10 according to the present disclosure has a plurality of segment boxes 100 each having any one of curved, straight line, and slanted shapes in such a way as to provide a structure with a given shape when coupled to one another and an accommodation space formed therein to accommodate planting soil 20 in which a plant 1 is planted.

According to a first embodiment of the present disclosure, first, the segment box 100 has the curved shape with a given curvature. For example, if a plurality of curved segment boxes 100 are connected to one another, a circular structure is provided.

In this case, each curved segment box 100 includes a plurality of side walls 110 extending in a longitudinal direction thereof to provide the accommodation space for the planting soil 20, a base 120 connecting the undersides of the plurality of side walls 110 to each other, a first connection rod 130 connecting first positions of one side end of the plurality of side walls 110 to each other, and a second connection rod 140 connecting second positions of the other side end of the plurality of side walls 110 to each other. Such a curved segment box 100 is open on top thereof.

The plurality of side walls 110 are curvedly formed to have the given curvature and have given length and height, while maintaining a given distance therebetween. If the curved segment boxes 100 are connected to one another to form the circular structure, the plurality of side walls 110 form concentric inscribed and circumscribed circles.

The base 120 is curvedly formed to connect the plurality of side walls 110 to each other so that the plurality of side walls 110 has the given curvature.

The first connection rod 130 connects the first positions (middle and lower ends) of one side end of the plurality of side walls 110 to each other, while forming given open areas on upper and lower portions of one side end of the plurality of side walls 110. In this case, the first position is set as a position corresponding to the middle and lower end if each side wall 110 is divided into four parts (upper end, upper and middle end, middle and lower end, and lower end) in a vertical direction. The first connection rod 130 connects the first positions, while having a given area and/or volume on one side end of the plurality of side walls 110.

Further, the first connection rod 130 has a first fastening hole 132 adapted to insert and/or pass a fastening member (not shown) thereinto and/or therethrough. In this case, the first fastening hole 132 is formed to pass through the first connection rod 130 in a vertical direction to the base 120.

Further, one end of the fastening member passing through one fastening hole or a plurality of neighboring fastening holes 132 or 142 coming into contact with one another is inserted into a base part (not shown, which is a floor surface on which the segment boxes 100 are built or made of concrete and reinforcing bars) on which the segment boxes 100 are built or fixedly attached to the base part. To do this, the fastening member (pin or reinforcing bar) is attached to the reinforcing bars (for improving the tensile strength and durability of the base part) built on the base part and/or floor surface by means of connection members (the reinforcing bars and wires of the base part, brackets, reinforcing bar couplers, and the like) or welding.

The second connection rod 140 connects the second positions (middle ends) of the other side end of the plurality of side walls 110 to each other, while being located above the first connection rod 130. In this case, the second position is set as a position corresponding to the middle and upper end if each side wall 110 is divided into the four parts (upper end, upper and middle end, middle and lower end, and lower end) in the vertical direction. The second connection rod 140 connects the second positions, while having a given area and/or volume on the other side end of the plurality of side walls 110.

Further, the second connection rod 140 has a second fastening hole 142 adapted to insert and/or pass the fastening member thereinto and/or therethrough. In this case, the second fastening hole 142 is formed to pass through the second connection rod 140 in a direction vertical to the base 120.

In this case, the first fastening holes 132 of the first connection rods 130 are formed to be overlaid on top of each other and the second fastening holes 142 of the second connection rods 140 are formed to be overlaid on top of each other, and accordingly, if the plurality of segment boxes 100 are connected to each other, the fastening members are fastened to the first fastening holes 132 and the second fastening holes 142.

The plurality of side walls 110, which are connected to the first connection rod 130 on one side end thereof and to the second connection rod 140 on the other side end thereof, have one side end and the other side end shaped complementarily to each other, and if the plurality of segment boxes 100 are connected (laminated) to (on) each other, one side end of the side walls 110 is engaged with the other side end of the neighboring side walls 110.

Further, the curved segment box 100 has a first "U"-shaped upper groove formed on at least one among the plurality of side walls 110, the first connection rod 130, and the second connection rod 140. The first groove serves to allow the disharmony of vertical (partition) walls and exposure of fragmented connection wires to be hidden by the planting soil 20 and/or vegetables, thereby making the vertical walls and the connection wires look like a unitary structure.

Further, the curved segment box 100 has a second "n"-shaped lower groove formed on at least one among the plurality of side walls 110, the first connection rod 130, and the second connection rod 140 to perform water and material circulation of the LID plant box 10. The second groove serves to provide a drainage path for circulating water and materials to the vertical (partition) wall. In this case, the planting soil 20 accommodated in the segment box 100 is divided into a planting layer (not shown) for planting and a gravel layer (not shown) for drainage. Further, the planting soil 20 has a perforated drain pipe (not shown) buried in the middle of the gravel layer to perform easy material circulation.

Figure 2:
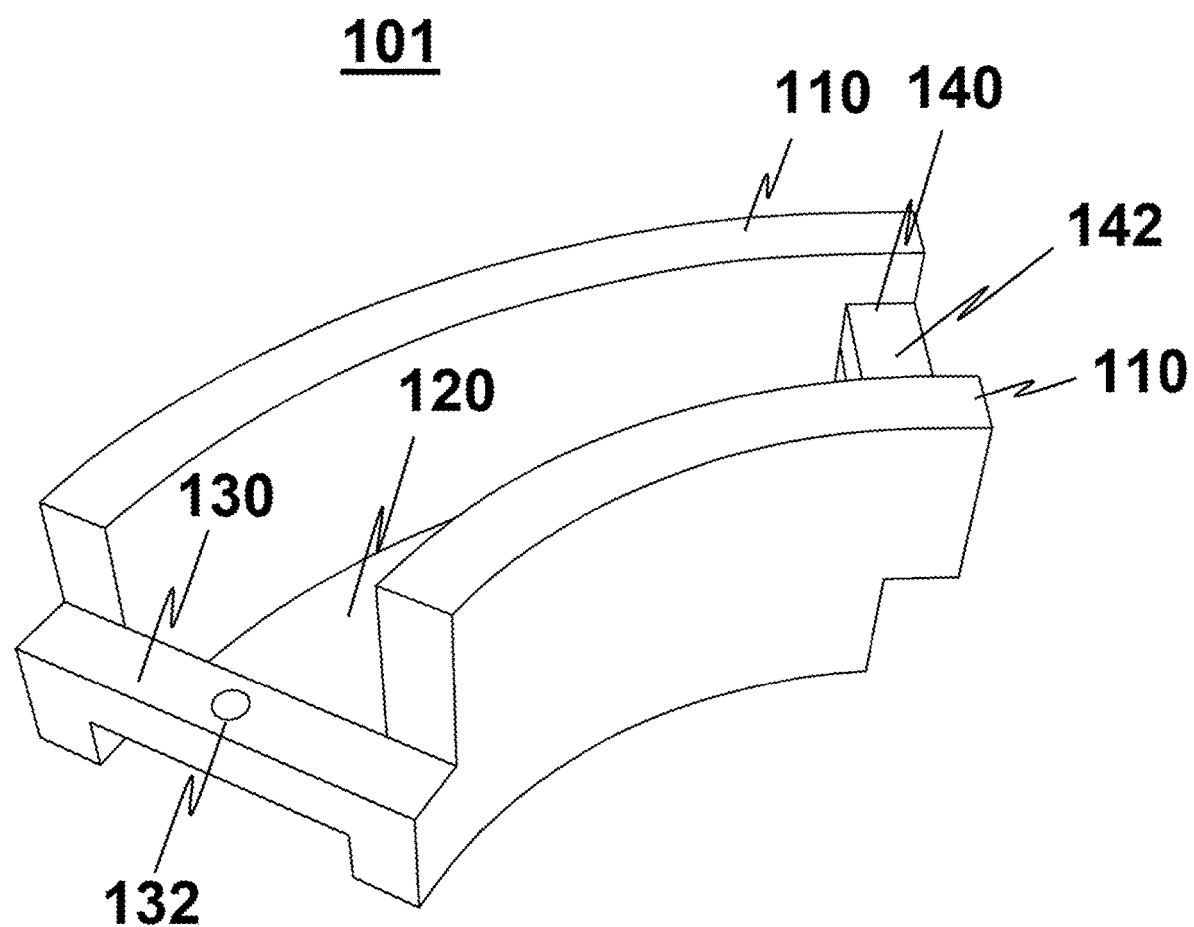
FIGS. 2 and 3 are perspective views showing curved segment boxes of the LID plant box according to the present disclosure.
Figure 3:
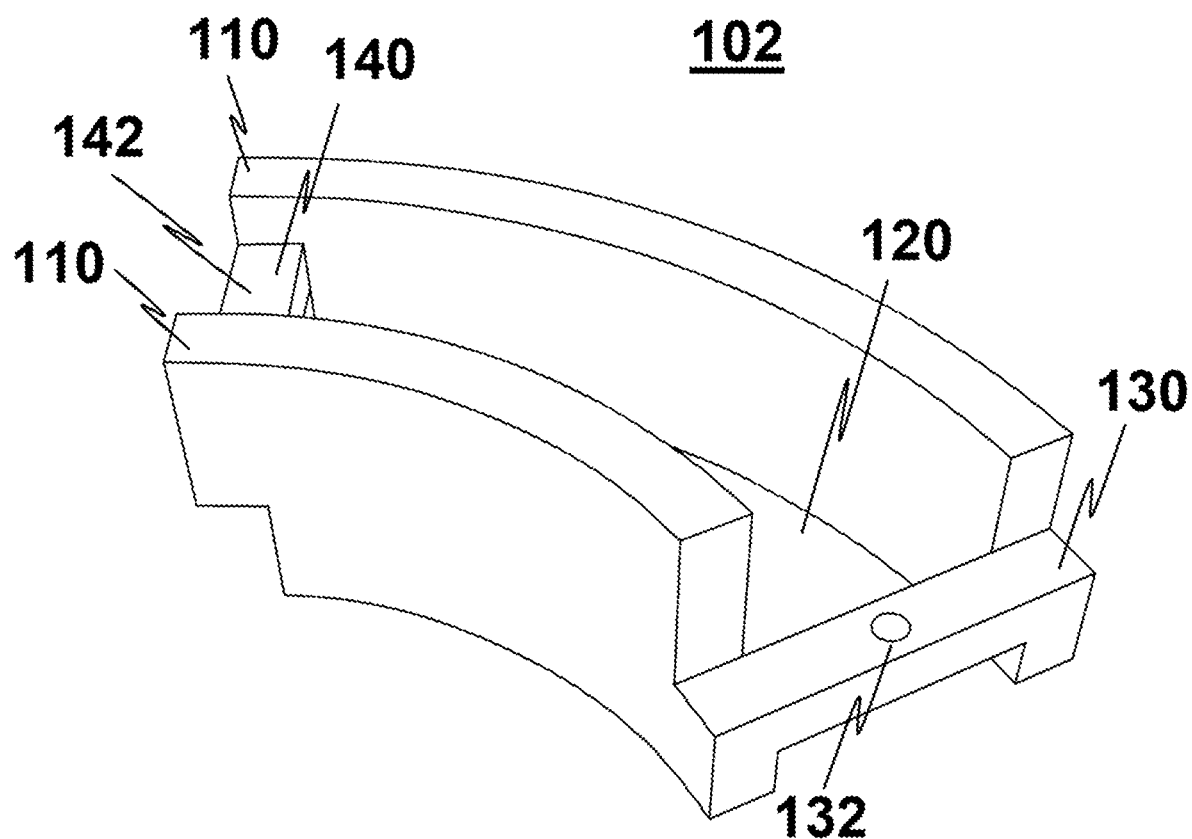
Figure 4:
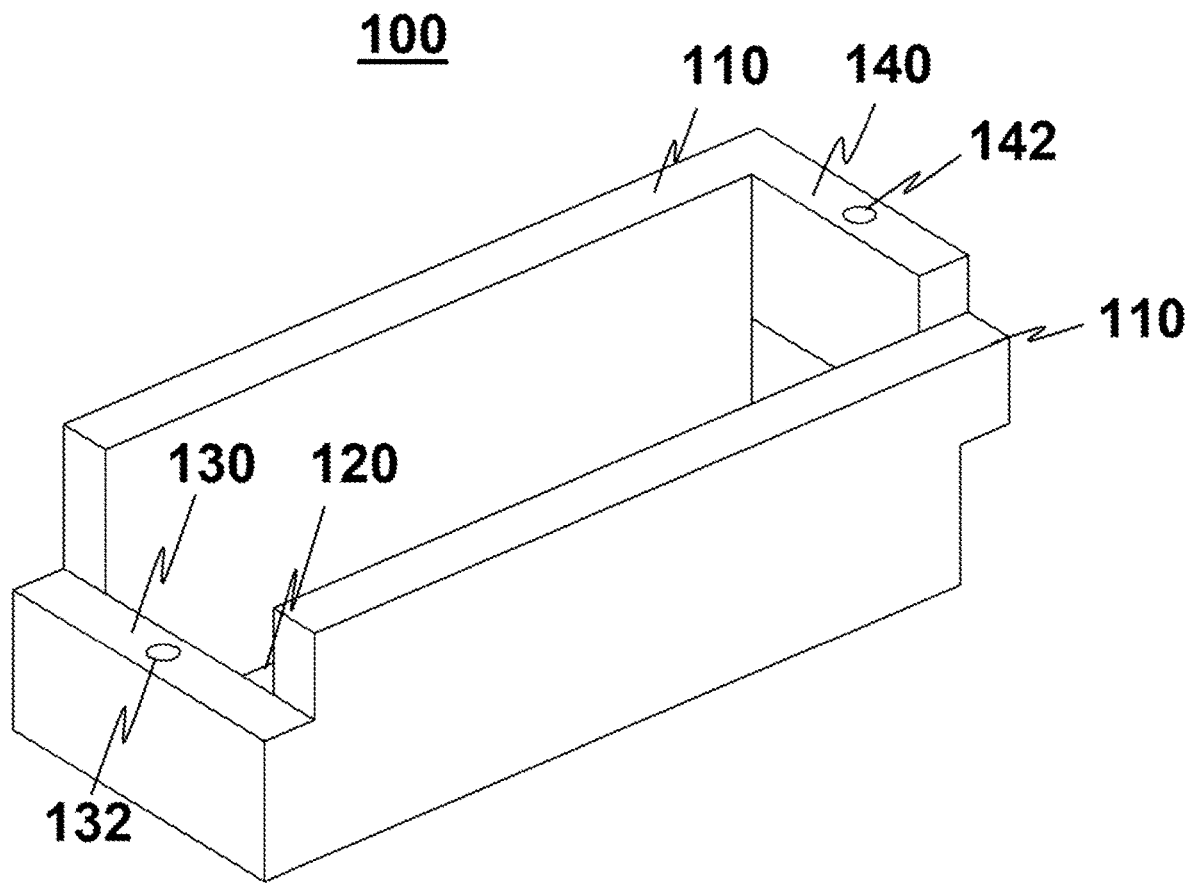
FIGS. 4 to 7 are perspective views showing straight line segment boxes of the LID plant box according to the present disclosure.
Figure 5:
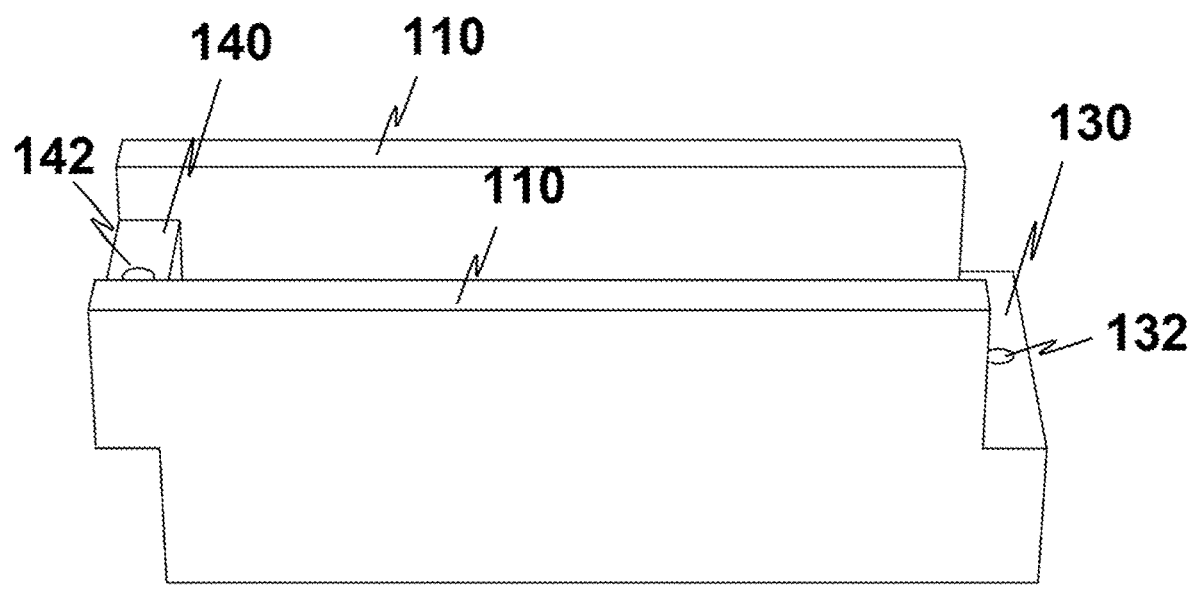
Figure 6:
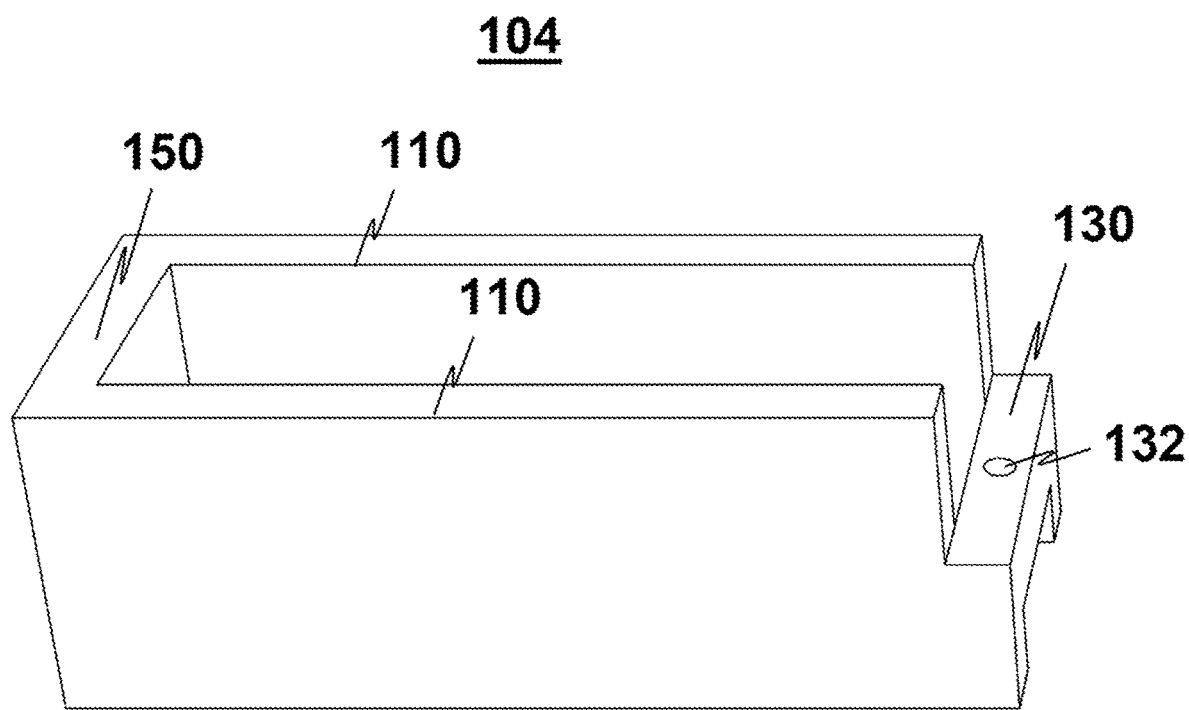
Figure 7:
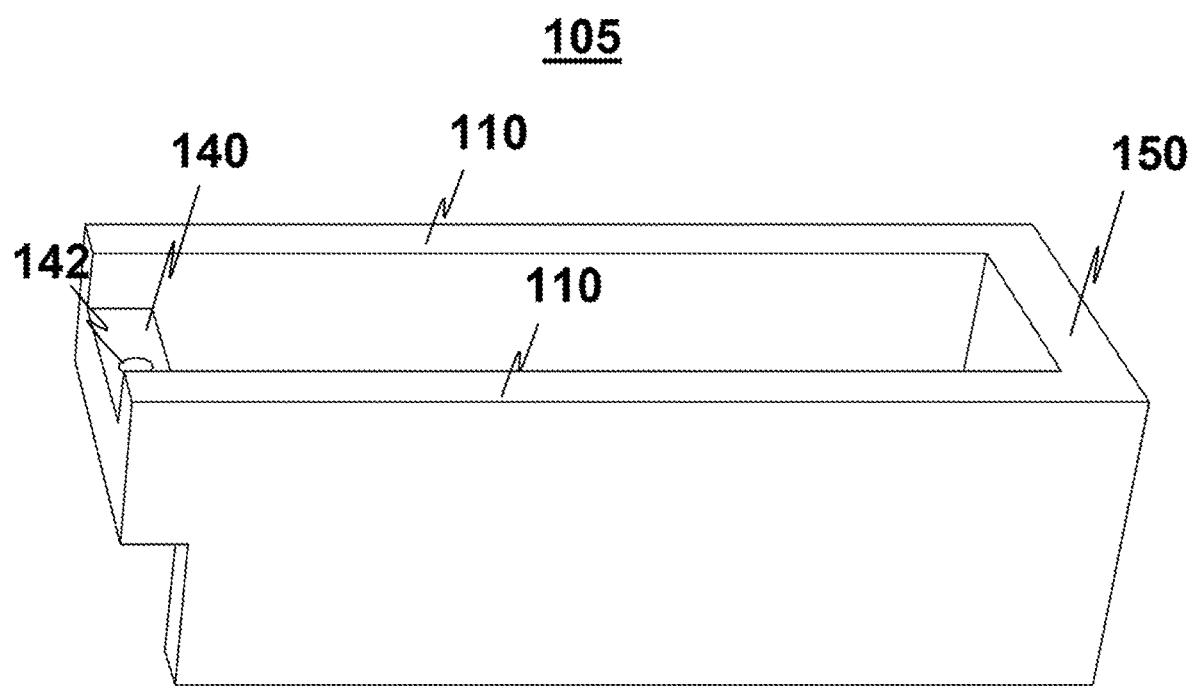
Figure 8:
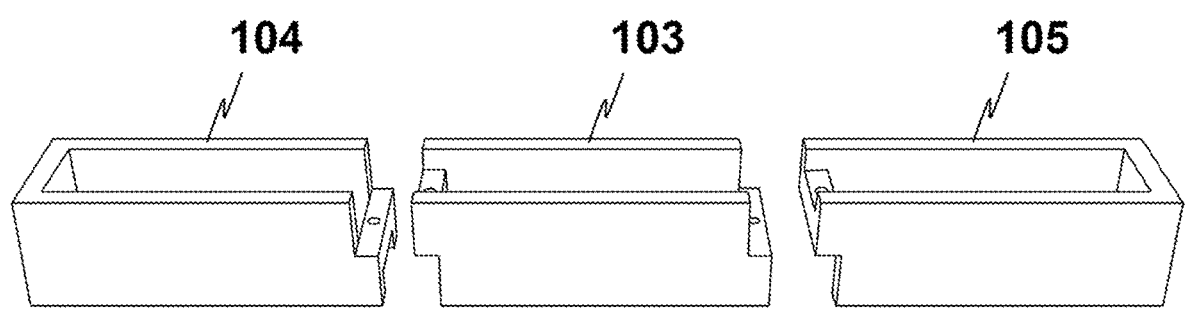
FIGS. 8 and 9 are perspective views showing coupling examples of the straight line segment boxes of the LID plant box according to the present disclosure.

An even number of curved segment boxes 100, for example, four 90-degree curved segment boxes, six 60-degree curved segment boxes, eight 45-degree curved segment boxes, and the like are connected to one another to provide the LID plant box 10. In this case, five 72-degree curved segment boxes 100 may be arranged to provide the LID plant box 10. Further, as shown in FIGS. 2 and 3, the curved segment boxes 100 are made to the shapes of a left curved segment box 101 and a right curved segment box 102 and thus provide the plant box 10.

If the curved segment boxes 100 are made in a single shape, irrespective of left and right and put together, they form a concentric circular hole.

According to a second embodiment of the present disclosure, next, the segment box 100 has the shape of a straight line rectangle so that it can be easily applied to the area around a road.

In this case, each straight line segment box 100 includes a plurality of side walls 110 extending in a longitudinal direction thereof to provide the accommodation space for the planting soil 20, a base 120 connecting the undersides of the plurality of side walls 110 to each other, a first connection rod 130 connecting first positions of one side end of the plurality of side walls 110 to each other, and a second connection rod 140 connecting second positions of the other side end of the plurality of side walls 110 to each other. Such a straight line segment box 100 is open on top thereof.

The plurality of side walls 110 extend in the longitudinal direction of the straight line segment box 100 to have the shapes of straight lines and have given length and height, while maintaining a given distance therebetween.

The base 120 is formed to the shape of a straight line and has given length and/or area to connect the plurality of side walls 110 to each other.

The first connection rod 130 connects the first positions (middle and lower ends) of one side end of the plurality of side walls 110 to each other, while forming given open areas on upper and lower portions of one side end of the plurality of side walls 110. In this case, the first position is set as a position corresponding to the middle and lower end if each side wall 110 is divided into four parts (upper end, upper and middle end, middle and lower end, and lower end) in a vertical direction. The first connection rod 130 connects the first positions, while having a given area and/or volume on one side end of the plurality of side walls 110.

Further, the first connection rod 130 has a first fastening hole 132 adapted to insert and/or pass a fastening member (not shown) thereinto and/or therethrough. In this case, the first fastening hole 132 is formed to pass through the first connection rod 130 in a vertical direction to the base 120.

Further, if the segment box 100 is fastened or laminated to or on the neighboring segment box 100 in their set direction, the first fastening holes 132 and/or the second fastening holes 142 of the segment boxes 100 laminated on top of each other are exposed to be open on tops thereof, and the fastening members such as pins or reinforcing bars are inserted into the fastening holes 132 and/or the second fastening holes 142 if necessary. As a result, the segment box 100 made of concrete or the like has good tensile strength, and further, the segment box 100 has a high resistance with respect to changes (pushing of the segment box 100 by soil and sand or application of an external force to the side surface of the segment box 100) in external environments on the slope on which the segment box 100 is installed.

The second connection rod 140 connects the second positions (middle ends) of the other side end of the plurality of side walls 110 to each other, while being located above the first connection rod 130. In this case, the second position is set as a position corresponding to the middle and upper end if each side wall 110 is divided into the four parts (upper end, upper and middle end, middle and lower end, and lower end) in a vertical direction. The second connection rod 140 connects the second positions, while having a given area and/or volume on the other side end of the plurality of side walls 110.

Further, the second connection rod 140 has a second fastening hole 142 adapted to insert and/or pass a fastening member thereinto and/or therethrough. In this case, the second fastening hole 142 is formed to pass through the second connection rod 140 in a direction vertical to the base 120.

In this case, the first fastening holes 132 of the first connection rods 130 are formed to be overlaid on top of each other and the second fastening holes 142 of the second connection rods 140 are formed to be overlaid on top of each other, and accordingly, if the plurality of straight line segment boxes 100 are connected to each other, so that the fastening members (pins, reinforcing bars, etc.) are fastened to the first fastening holes 132 and the second fastening holes 142. In this case, as mentioned above, the fastening members such as the reinforcing bars, which can be easily supplied and utilized on the site, improve the tensile strength of the segment box 100 made of the concrete or the like and the resistance with respect to changes in external environments to prevent the segment box 100 from arbitrarily escaping from the fixed position thereof.

The plurality of side walls 110, which are connected to the first connection rod 130 on one side end thereof and to the second connection rod 140 on the other side end thereof, have one side end and the other side end shaped complementarily to each other, and if the plurality of segment boxes 100 are connected (laminated) to (on) each other, one side end of the side walls 110 is engaged with the other side end of the neighboring side walls 110.

Further, the straight line segment box 100 has a first "U"-shaped upper groove formed on at least one among the plurality of side walls 110, the first connection rod 130, and the second connection rod 140. The first groove serves to allow the disharmony of vertical (partition) walls and exposure of fragmented connection wires to be hidden by the planting soil 20 and/or vegetables, thereby making the vertical walls and the connection wires look like a unitary structure.

Further, the straight line segment box 100 has a second "∩"-shaped lower groove formed on at least one among the plurality of side walls 110, the first connection rod 130, and the second connection rod 140 to perform water and material circulation of the LID plant box 10. The second groove serves to provide a drainage path for circulating water and materials to the vertical (partition) wall. In this case, the planting soil 20 accommodated in the segment box 100 is divided into a planting layer (not shown) for planting and a gravel layer (not shown) for drainage. Further, the planting soil 20 has a perforated drain pipe (not shown) buried in the middle of the gravel layer to perform easy material circulation.

Further, there are three types of straight line segment boxes 100, that is, a basic segment box 103, a left segment box 104, and a right segment box 105. In this case, the basic segment box 103 includes the first connection rod 130 disposed on one side end thereof and the second connection rod 140 disposed on the other side end thereof.

Further, the left segment box 104 has a finishing wall 150 disposed on one side end of the plurality of side walls 110 to connect the plurality of side walls 110 to each other, and the right segment box 105 has a finishing wall 150 disposed on the other side end of the plurality of side walls 110 to connect the plurality of side walls 110 to each other. In this case, the left segment box 104 has the first connection rod 130 disposed on the opposite side to the finishing wall 150, and the right segment box 105 has the second connection rod 140 disposed on the opposite side to the finishing wall 150.

Further, the left segment box 104 and the right segment box 105 may include a left finishing accessory and a right finishing accessory corresponding to the finishing walls 150 to avoid the occurrence of inconveniences of left and right distinguishment and improve the constructability thereof.

Figure 9:
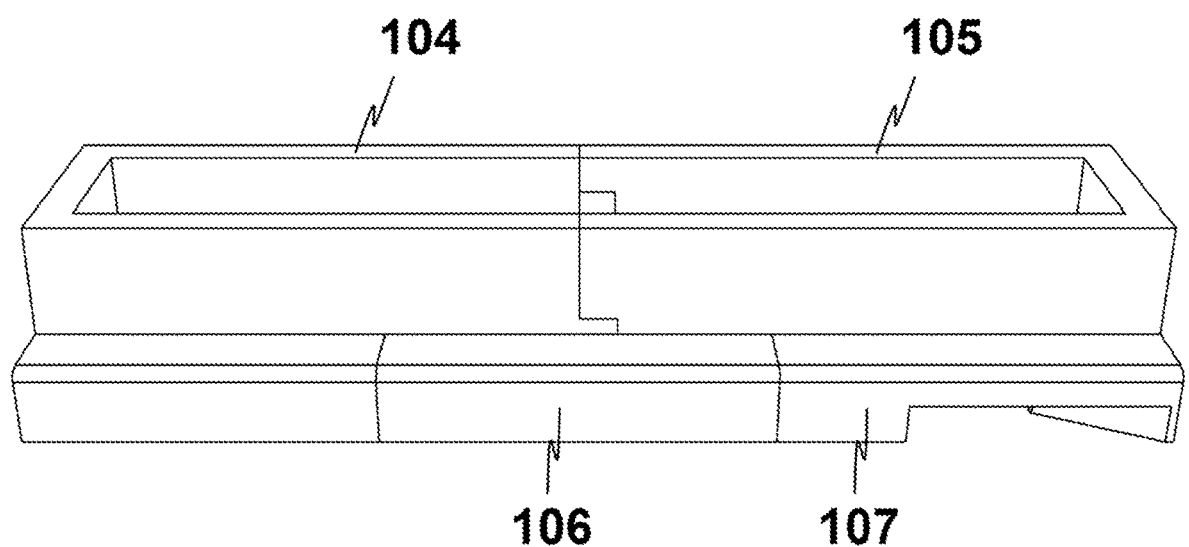

As shown in FIG. 9, the straight line segment box 100 is set in size to be easily compatible with curb stone 106 according to the characteristics of roads. Further, the straight line segment box 100 is combined with an infiltration facility adopting drain curb stone 107, thereby improving its functions. As a result, the LID plant box 10, which is combined with the infiltration facility for improving the function of reducing non-point pollutant sources generated upon the flow of rainwater over the roads, is provided.

For example, the segment box 100 is combined with the drain curb stone 107 in one direction of the curb stone and introduces the rainwater into the gravel layer and the perforated drain pipe disposed on the lower portion of the LID plant box 10, and accordingly, the LID plant box 10 combined with the infiltration facility absorbs and treats about 5 mm or more of initially accumulated rainfall.

According to a third embodiment of the present disclosure, next, the segment box 100 has the shape of a slanted rectangle so that it can be easily applied to a sloping area.

In this case, the slanted segment boxes 100 are installed on a sloping area to connect streets or sidewalk and roadway with different heights. Each slanted segment box 100 includes a plurality of side walls 110 extending in a longitudinal direction thereof to provide the accommodation space for the planting soil 20, a base 120 connecting the undersides of the plurality of side walls 110 to each other, and finishing walls 150 disposed on one side end and the other side end of the plurality of side walls 110 to connect the plurality of side walls 110 to each other.

In this case, each slanted segment box 100 has support projections 160 formed on top of any one of the plurality of side walls 110 by means of "L"-shaped chamfering. Accordingly, the slanted segment boxes 100 are applied in a stepped shape to sloping areas, such as sloping roads, sloping sites, construction sites, and the like.

Figure 10:
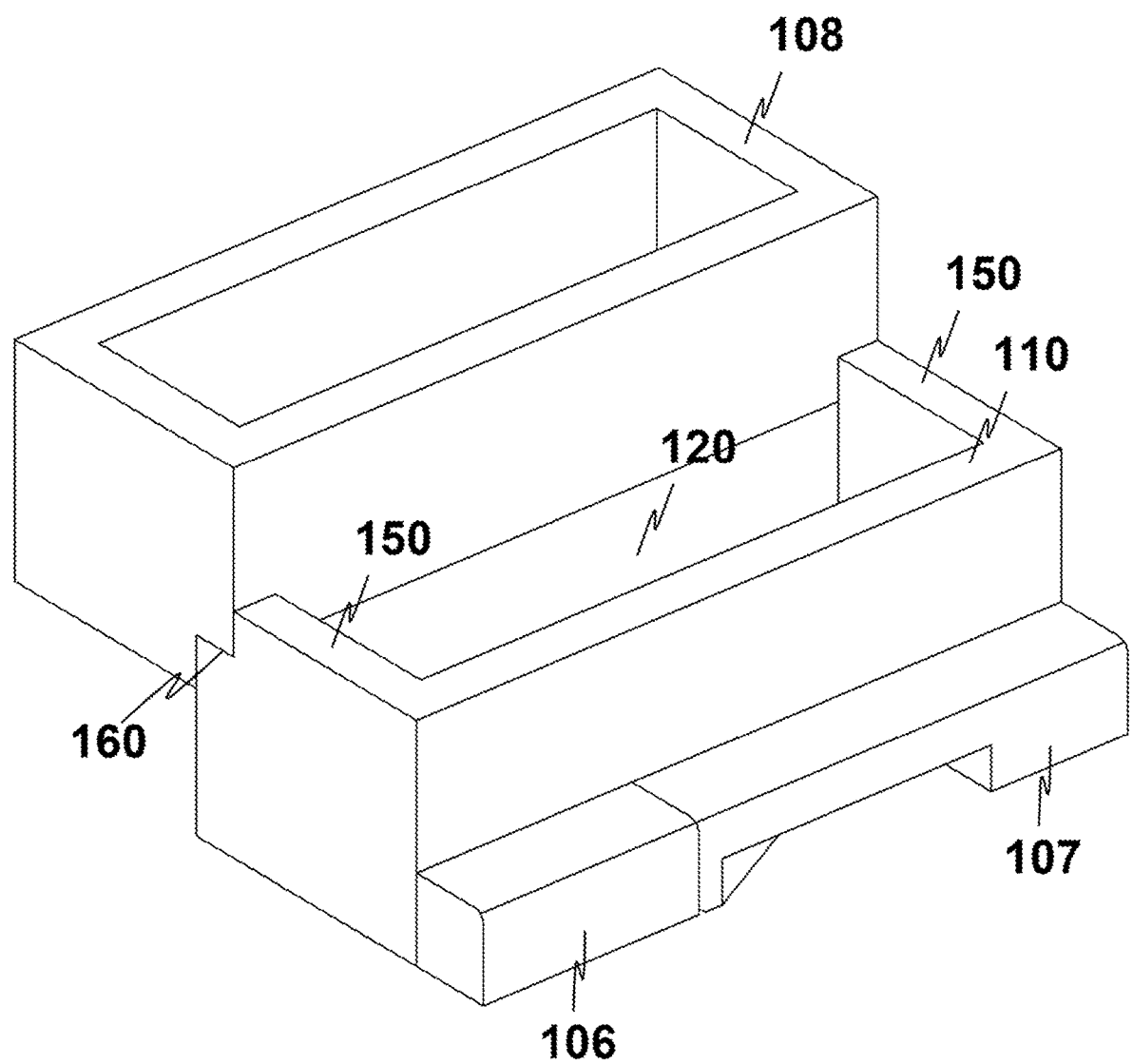
FIG. 10 is a perspective view showing a coupling example of slanted segment boxes of the LID plant box according to the present disclosure.

As shown in FIG. 10, the slanted segment box 100 is set in size to be easily compatible with an infiltration ditch structure 108 and curb stone 106 according to the characteristics of roads to connect streets or sidewalk and roadway with different heights. Further, the slanted segment box 100 is combined with an infiltration facility adopting drain curb stone 107 on the sloping area, thereby improving its functions. As a result, the LID plant box 10, which is combined with the infiltration facility for improving the function of reducing non-point pollutant sources generated upon the flow of rainwater over the roads, is provided.

Figure 11:
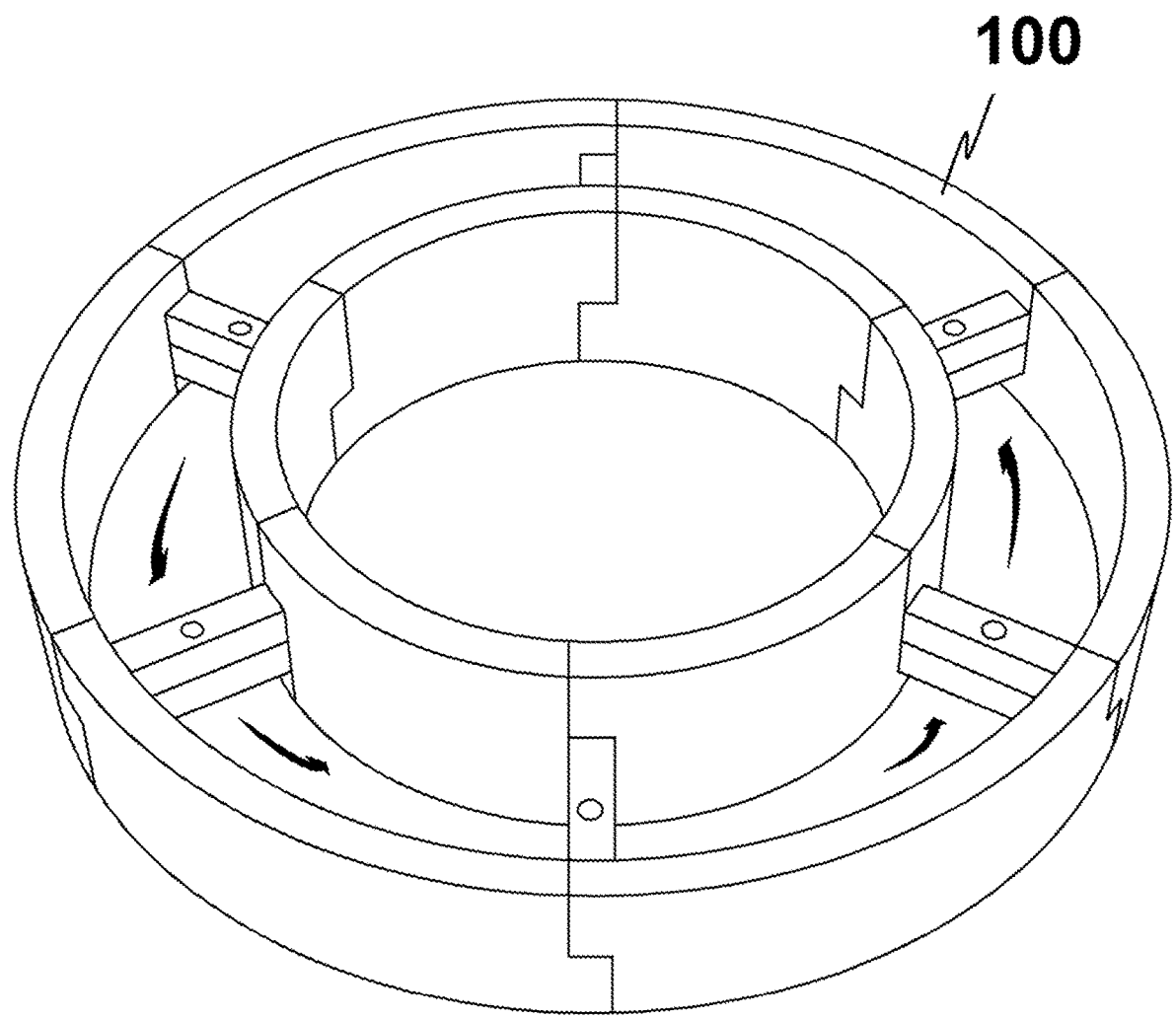
FIGS. 11 to 13 are perspective views showing examples of coupling structures of the LID plant box according to the present disclosure.

As shown in FIG. 11, the LID plant box 10 according to the present disclosure is provided as a circular plant box by coupling the plurality of curved segment boxes 100 to one another.

Figure 12:
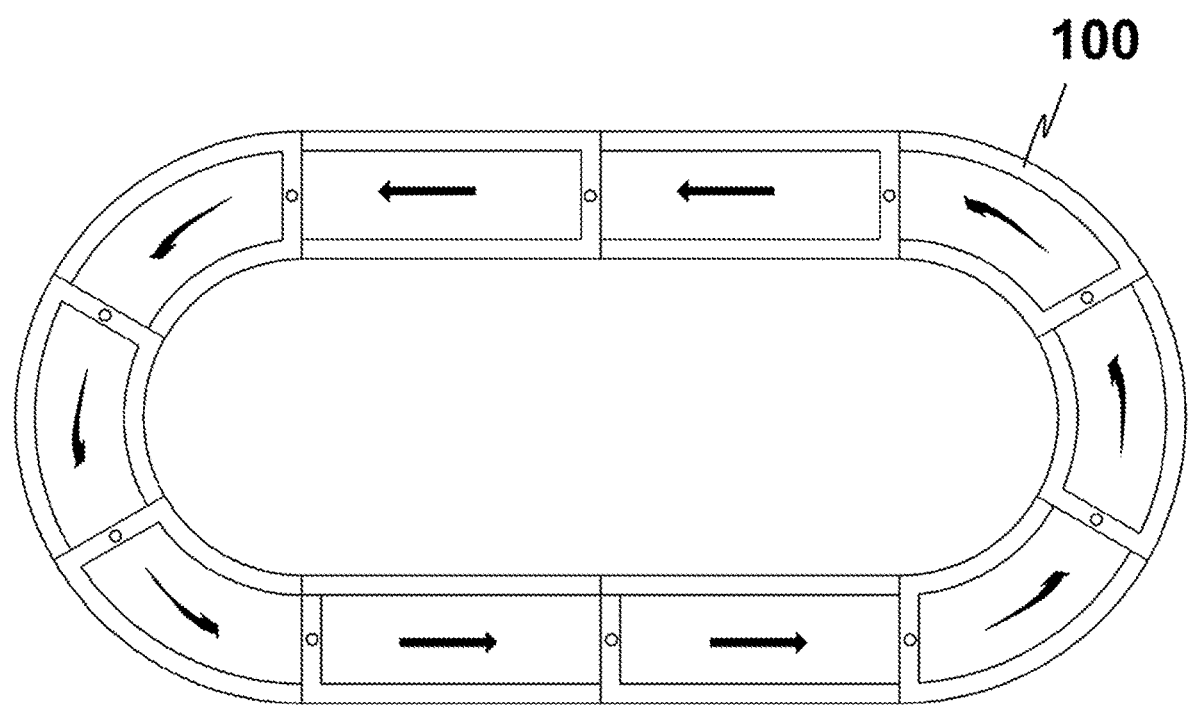

As shown in FIG. 12, further, the LID plant box 10 according to the present disclosure is provided as an oval plant box by coupling the plurality of curved segment boxes 100 and the plurality of straight line segment boxes 100 to one another.

Figure 13:
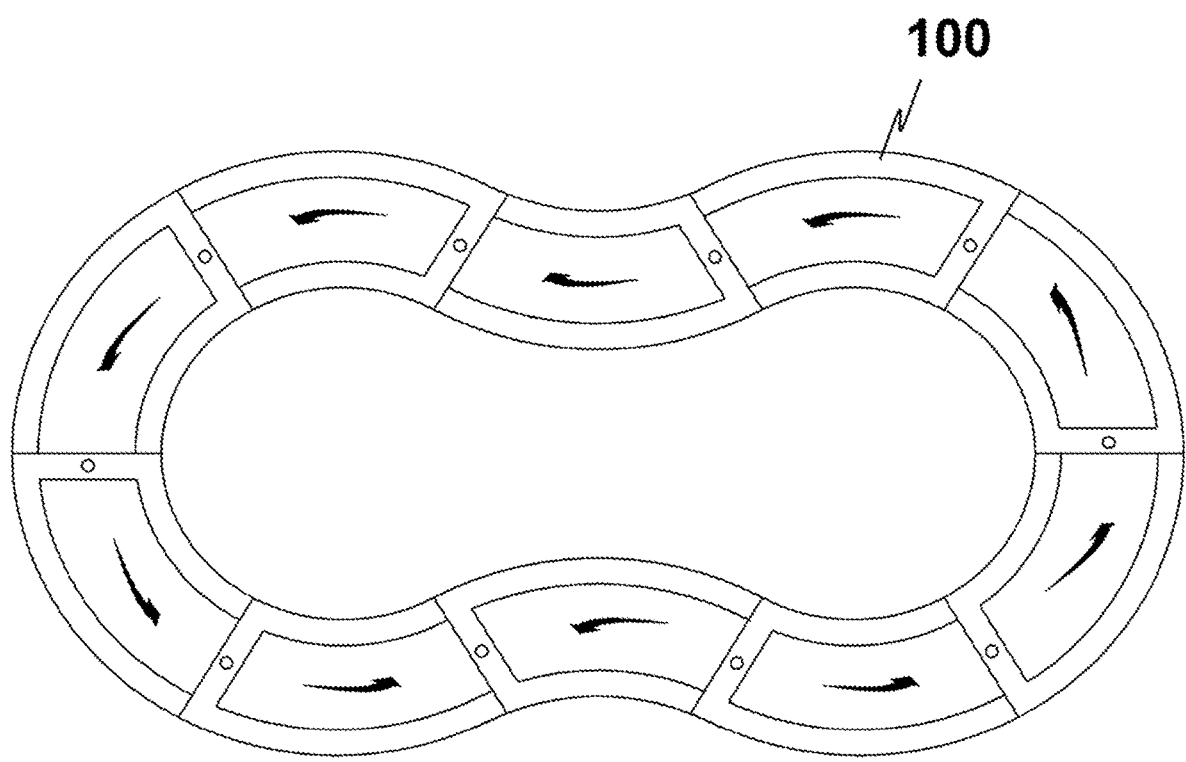

As shown in FIG. 13, furthermore, the LID plant box 10 according to the present disclosure is provided as a peanut type (8-shaped) plant box by coupling the plurality of left curved segment boxes 100 and the plurality of right curved segment boxes 100 to one another.

According to the embodiment of the present disclosure, the LID plant box allows the flow of rainwater over the roads to be returned to a natural water circulation system through infiltration, storage, and evapotranspiration, and the LID plant box is easy in construction and reduced in a construction cost.

According to the embodiment of the present disclosure, further, the LID plant box reduces an impervious rate and a biotope area rate upon urban development.

According to the embodiment of the present disclosure, furthermore, the LID plant box is applied to the flower bed adjacent to the existing building and omits a process of forming a structure thereof, thereby reducing a period of construction and a construction cost, and the LID plant box is converted into a dry type plant box from the existing wet type plant box to prevent the occurrence of efflorescence on the surfaces of finishing materials such as marble, red bricks, and the like due to frostiness and moisture, thereby being easy in the maintenance thereof.

According to the embodiment of the present disclosure, in addition, the LID plant box has different types of flowing plants planted in independent spaces thereof, thereby providing various changes in a cityscape according to seasons.

According to the embodiment of the present disclosure, besides, the LID plant box replaces a green infrastructure on the road therewith, has better non-point pollutant source reduction effectiveness than permeable blocks built on sidewalks, is easily utilized as a structural wall of a flower bed around a building, and avoids a wet construction method in building the flower bed around a building to reduce a period of construction and improve profitability and constructability.

According to the embodiment of the present disclosure, further, the LID plant box allows the segment boxes having the straight line rectangular shapes easily applicable to the roads to be combined with the infiltration facilities adopting the drain curb stone of the roads, thereby improving the functions thereof.

According to the embodiment of the present disclosure, additionally, the LID plant box couples the left and right curved segment boxes and the left and right straight line segment boxes to one another in various shapes, thereby having various shapes.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above teachings. For example, the parts expressed in a singular form may be dispersedly provided, and in the same manner as above, the parts dispersed may be combined with each other.

It is therefore intended that the scope of the disclosure be limited not by this detailed description, but rather by the claims appended hereto. It is to be appreciated that those skilled in the art can change or modify the embodiments without departing from the scope and spirit of the present disclosure.

What is claimed is:

1. A low impact development plant (LID) plant box configured to be built on a road and/or residential area, the LID plant box comprising:
   a plurality of segment boxes, each having any one of a curved shape, straight shape, and slanted shape such that the plurality of segment boxes form a structure with a predetermined shape when the plurality of segment boxes are coupled to one another, each of the plurality of segment boxes having an accommodation space defined therein to accommodate planting soil in which a plant is planted,
   wherein each of the plurality of segment boxes comprises:
   a plurality of side walls extending in a longitudinal direction of each of the plurality of segment boxes;
   a base connecting undersides of the plurality of side walls to each other;
   a first connection rod connecting first positions of one side end of the plurality of side walls to each other; and
   a second connection rod connecting second positions of another side end of the plurality of side walls to each other, and
   wherein the first connection rod connects the first positions of the one side end of the plurality of side walls to each other, while forming predetermined open areas on upper and lower portions, respectively, of the one side end of the plurality of side walls.

2. The LID plant box according to claim 1,
   wherein the second connection rod connects the second positions of the another side end of the plurality of side walls to each other, while being positioned above the first connection rod.

3. The LID plant box according to claim 2,
   wherein the first connection rod or the second connection rod has a fastening hole adapted to insert and/or pass a fastening member thereinto and/or therethrough, the fastening hole being defined through the first connection rod or the second connection rod in a vertical direction to the base.

4. The LID plant box according to claim 1,
   wherein each of the plurality of segment boxes has the curved shape, and
   wherein the plurality of curved segment boxes are coupled to one another to form a circular structure, while being arranged at predetermined angles and/or in a predetermined number of the plurality of curved segment boxes.

5. The LID plant box according to claim 1,
   wherein the plurality of segment boxes comprise left curved segment boxes and right curved segment boxes, and the left curved segment boxes and the right curved segment boxes are coupled to one another to form a peanut-shaped structure.

* * * * *